Feb. 18, 1958 C. J. FRITTS 2,823,418
FLANGING TOOL
Filed Dec. 31, 1953 3 Sheets-Sheet 1

CHARLES J. FRITTS
INVENTOR.

BY Frederick E. Dumoulin
ATTORNEY

Feb. 18, 1958     C. J. FRITTS     2,823,418
FLANGING TOOL

Filed Dec. 31, 1953     3 Sheets-Sheet 2

CHARLES J. FRITTS
INVENTOR.

BY Frederick E. Dumoulin
ATTORNEY

CHARLES J. FRITTS
INVENTOR.

BY Frederick E. Dumoulin
ATTORNEY

United States Patent Office 2,823,418
Patented Feb. 18, 1958

2,823,418

FLANGING TOOL

Charles J. Fritts, Dallas, Tex., assignor, by mesne assignments, to Socony Mobil Oil Company, Inc., a corporation of New York Application December 31, 1953, Serial No. 401,681

2 Claims. (Cl. 18—19)

This invention relates to a flanging tool and relates more particularly to a tool for applying flanges to plastic liners within a metal pipe line.

The replacement of metal pipe lines which have been rendered unsatisfactory for further use by internal corrosion presents a serious economic problem in many industries. Many methods of preventing internal corrosion of metal pipe lines such as by chemical treatment of the metal of the pipe lines or by chemical treatment of the fluids carried by the pipe lines have been presented as possible solutions to the problem. Recently, as a means for preventing internal corrosion of metal pipe lines and as a means for rendering internally corroded metal pipe lines fit for further use, it has been proposed to provide within the metal pipe lines a liner of a non-corrodable plastic material. With this arrangement, a conduit is provided which, by virtue of the liner of plastic material, is resistant to internal corrosion caused by fluids carried within the conduit and, by virtue of the outer metal pipe, is resistant to internal pressures which would otherwise injure the liner of plastic material. While the use of the inner liner of non-corrodable plastic material is not limited to metal pipe lines joined by any particular type of joint, the liners are most conveniently used in metal pipe lines joined by flange joints.

It is an object of this invention to provide a flanging tool. It is a more particular object of this invention to provide a tool for applying flanges to plastic liners used within metal pipe lines. Further objects of the invention will become apparent from the following detailed description thereof.

Figure 1:
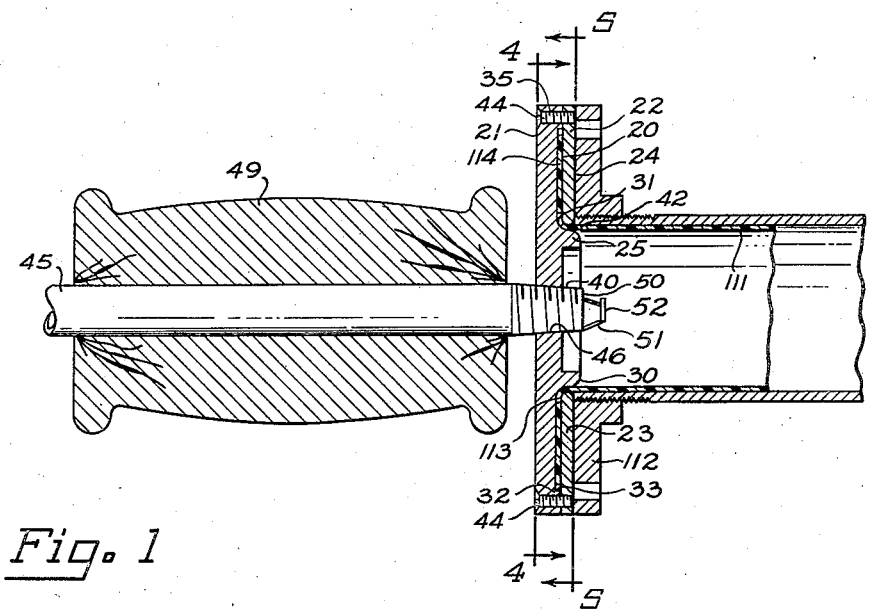
Figure 1 is a side view in section of a flanging tool constructed in accordance with the invention and of a metal pipe line having a plastic liner and illustrates use of the tool for applying a flange to the plastic liner.

Referring now to the figures, a flange-receiving chamber 20 is provided by means of plate 21 and semi-annular plates 22 and 23. The semi-annular plates 22 and 23 together form an annular disk 24. The plate 21 at its center portion is provided with a circular, outwardly-flaring ridge 25 and the ridge is preferably rounded at the shoulder 30 and the step 31. The plate at its periphery is provided with circular ridge 32 having shoulder 33, the ridge 32 being shallower, with reference to the face 34 of the plate 21, than the ridge 25. The plate 21 has a plurality of holes 35 near the periphery thereof and the holes are preferably uniformly spaced with respect to each other. The holes 35 are also countersunk to receive a screw head. A threaded port 40 provided with threads 41 passes through the center of the plate 21. The semi-annular plates 22 and 23 have the same external diameter as the plate 21. Their internal diameters, however, are larger than the external diameter of the ridge 25 on the plate 21 whereby a liner entry port 42 is provided adjacent to the ridge. The external diameter of the shoulder 30 is less than that of the plastic liner to which the flange is to be applied. A plurality of holes 43 are provided near the periphery of the plates 22 and 23 and these holes are spaced to be coincident with the holes 35. The holes 43 are threaded whereby screws 44 may be passed through holes 35 and screwed into holes 43 to hold the semi-annular plates in position with respect to plate 21.

A pipe 45 provided with threads 46 is screwed into the port 40, threads 41 and 46 cooperating with each other, and handle 49 surrounds the pipe. The pipe 45, across the opening 50 thereof, is provided with a spider 51 having a plate 52 mounted thereon perpendicular to the longitudinal axis of the pipe.

Heater 60 comprises two semi-annular boxes 61 and 62 movably joined by hinge 63. Each box is formed of a semi-circular bottom plate 64, the plate having a lip 65 extending about the periphery thereof, and a semi-circular top plate 70. The outside diameter of the top plate 70 is equal to the outside diameter of the lip 65 on the bottom plate 64 and the inside diameter of the lip 65 is greater than the outside diameters of the plate 21 and the semi-annular plates 22 and 23. The lip 65 of the bottom plate is provided with a plurality of holes 71 and the top plate 70 is provided with a plurality of holes 72, the holes 71 and 72 being spaced to be coincident, and the plates 64 and 70 are maintained in contact by means of a plurality of screws 73. The bottom plates each have a semi-circular indentation 74 at the central portion thereof, the diameter of each of which indentations is greater than the diameter of the pipe 45. The top plates have a semi-circular indentation 75 at the central portion thereof, the diameter of each of which indentations is greater than the inner diameter of the semi-annular plates 22 and 23.

Provided within the bottom plate 64 and the top plate 70 of each of boxes 61 and 62 are, respectively, electrical heating elements 80 and 81. Attached to the side of box 61 are electrical connecting prongs 82 and 83. The heating elements 80 and 81 are connected in series and conductor 84 is connected between prong 82 and heating element 80, conductor 85 is connected between heating elements 80 and 81, and conductor 90 is connected between heating element 81 and prong 83. Preferably, the heating elements 80 and 81 operate on low voltage current in order to minimize hazards to the operator of the tool.

Hinge 63 comprises hinge leaves 91 and 92, connected respectively to boxes 61 and 62 by means of screws 93, and hinge pin 94. To hold the opposite end of boxes 61 and 62 in contact, buckle 95 is provided. Hasp plate 100, to which is fastened hasp 101, is attached to box 61 by means of screws 102 and pin plate 103 provided with pin 104 is attached to box 62 by means of screws 105.

Each of the parts of the flanging tool may be constructed of metal, although the handle 49 may be of a material such as wood. The plates 64 and 70 of the boxes 61 and 62 may also be constructed of metal in which case suitable insulation is provided for electrical elements 80 and 81 and the conductors connected to them. However, the plates 64 and 70 may be constructed of an electrical insulating material such as a ceramic.

In one manner of operation of the flanging tool, a plastic flange is placed in the flange-receiving chamber 20, the heater 60 is closed around the plate 21 and the semi-annular plates 22, and the plates are heated. Thereafter, the heater is removed and the tool is manipulated with respect to the plastic liner within the metal pipe line so as to contact the plastic liner and the flange within the flange-receiving chamber. By heating the plates 21 and 22, the flange, if thermoplastic, is softened. Further, by heating the plates, a heat reservoir is provided whereby the end of the plastic liner, if thermoplastic, is also softened. With either or both the flange and the liner being softened as a result of the heating, contact of the flange with the liner within the flange-receiving chamber causes the flange and the liner to join to form an integral structure. The tool, after cooling, is removed from the flanged plastic liner.

The flange is preferably formed of the same type of plastic material as the liner. However, a different type of plastic material may be employed if desired. Suitable types of plastic material for liners and flanges include polyethylene, polyvinyl chloride, and polystyrene and copolymers of polystyrene.

Figure 2:
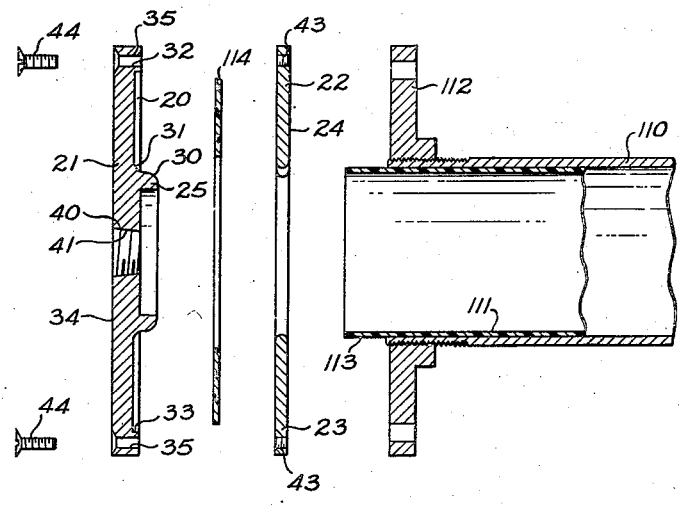
Figure 2 is an exploded view in section of a portion of Figure 1.
Figure 3:
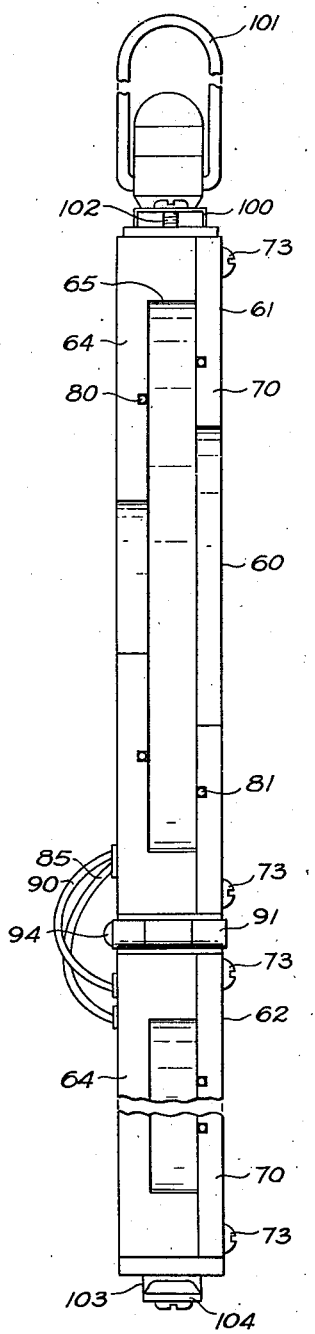
Figure 3 is a side view in section of a heater for the flanging tool of Figures 1 and 2, the heater being shown in an opened position.
Figure 4:
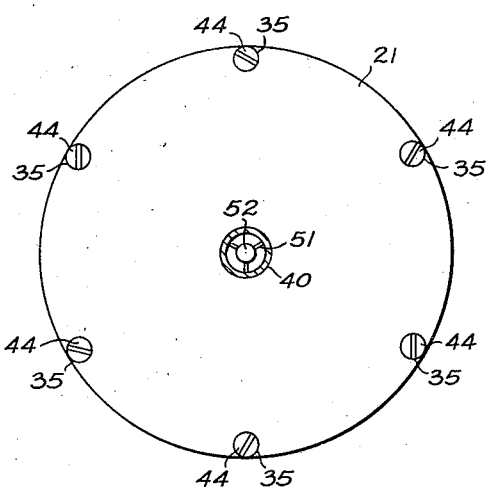
Figure 4 is a plan view along the line 4—4 of Figure 1.
Figure 5:
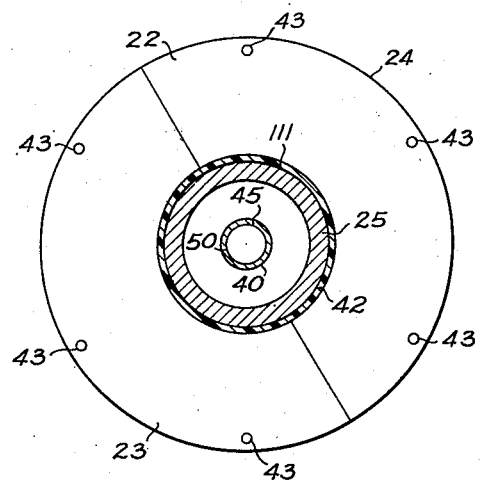
Figure 5 is a plan view along the line 5—5 of Figure 1.
Figure 6:
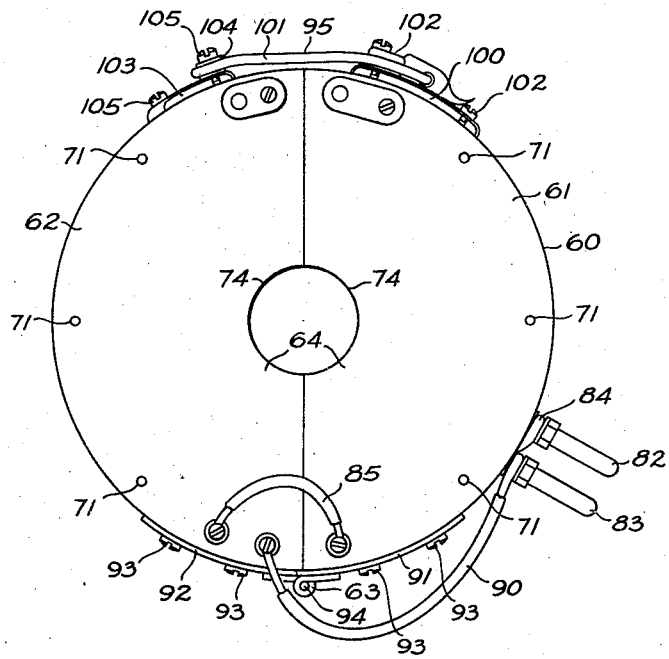
Figure 6 is a plan view of one side of the heater of Figure 3.
Figure 7:
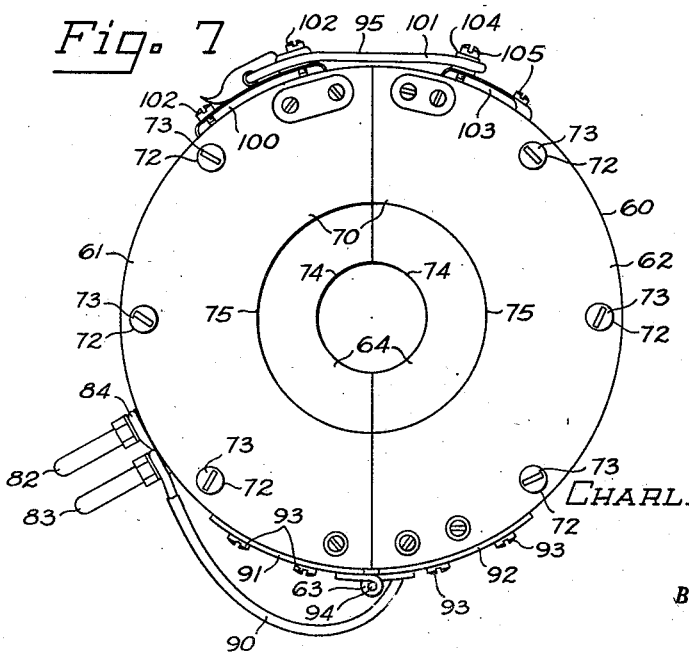
Figure 7 is a plan view of the other side of the heater of Figure 3.

Referring to Figures 1 and 2, metal pipe line 110 is provided with internal plastic liner 111. The metal pipe line is also provided with flange 112. Flange 112 is shown as being attached to the metal pipe line by means of threads, although the flange may be attached to the metal pipe line by means of threads, although the flange may be attached to the metal pipe line by other means. A portion 113 of the plastic liner 111 is left to protrude from the metal pipe line. With semi-annular plates 22 and 23 removed from the plate 21, an annular disk or flange 114 of plastic material is placed around the ridge 25. The semi-annular plates 22 and 23 are placed back in position in contact with plate 21 and the screws 44 are screwed into place and tightened. The flange 114 is thus positioned within the flange-receiving chamber 20. The heater 60, with buckle 95 being open, is swung open about hinge 63 and thereafter closed around the plate 21 and the plates 22 and 23. The buckle 95 is then closed.

Prongs 82 and 83 are connected to a suitable source of electric current, and electric current is passed through the electrical heating elements 80 and 81. Passage of current is continued until the tool is at the temperature that will effect softening of either or both of the flange 114 and the liner 111. The buckle 95 is then opened and the heater is removed from the plate 21 and the semi-annular plates 22 and 23. Thereafter, before the temperature of the tool has become lower than the temperature required to join the flange 114 and the liner 111, the tool is placed such that the circular ridge enters interiorly of the portion 113 of the plastic liner 111. The tool is pressed toward the metal pipe line 110 so that the portion 113 of the plastic liner enters the liner entry port 42. The diameter of the shoulder 30 is such that the liner moves easily over the shoulder and over the step 31 and forms a lip entering the flange-receiving chamber 20 and contacting the flange 114. The liner 111 and the flange 114 join together and upon cooling become integral with each other. To assist in cooling the tool and the flange liner after joining of the flange and the liner, a stream of air or water may be forced through the pipe 45 which, striking the plate 52, is deflected to contact the plate 21 and the liner 111. Following cooling, the screws 44 are removed, the semi-annular plates 22 and 23 are separated from the plate 21, and the tool is removed from the flanged liner.

Various modifications may be made in the above described apparatus and the manner of its use without departing from the spirit of the invention. For example, the tool may be heated by other means than the electrical heater 60. For this purpose, any suitable heating means may be employed. Furthermore, means other than screws 44 may be employed for holding the semi-annular plates 22 and 23 in position with respect to plate 21. Additionally, where the plastic liner 111 is formed of a material such as polyvinyl chloride which is capable of at least some degree of flow when heated, a plastic flange 114 need not be placed in the chamber 20 but the tool may simply be heated, placed such that the ridge 25 enters interiorly of the portion 113 of the plastic liner, and pressed toward the metal pipe line so that the portion 113 of the plastic liner enters the liner entry port 42. By this procedure the portion 113 flows over the shoulder 30 and step 31 into the flange-receiving chamber and therein forms a flange. Of course, when employing this procedure, the portion 113 of the plastic liner should be of sufficient length to provide sufficient material to form the flange. These, and other modifications of the invention, will be apparent to those skilled in the art.

Having thus described my invention, it will be understood that such description is given by way of illustration and example and not by way of limitation, reference for the latter purpose being had to the appended claims.

I claim:

1. A tool of the character described comprising in combination a plate having one face forming a plane surface, a lip extending along the periphery of the other face of said plate, a circular ridge on said last mentioned face of said plate disposed centrally thereof, a rounded step at the base of said circular ridge, an annular disk having an outer diameter equal to the diameter of said plate positioned on said lip on said plate, whereby a chamber adapted to receive a flange is formed between said plate and said annular disk, the two faces of said annular disk forming plane parallel surfaces, said annular disk having an inner diameter greater than the outer diameter of said circular ridge on said plate whereby an annular liner entry port leading to said chamber is formed between said circular ridge and said annular disk, means located within said annular disk and said plate at a level not above the unopposed plane surfaces of said annular disk and said plate for separably attaching said annular disk to said plate, a handle attached to said plate at the face forming a plane surface, means providing a fluid entry port passing through said plate and disposed substantially centrally of said circular ridge, a conduit leading through said handle to said fluid port, and fluid deflecting means located at the downstream side of said fluid port.

2. A tool of the character described comprising in combination a plate having one face forming a plane surface, a lip extending along the periphery of the other face of said plate, a circular ridge on said last mentioned face of said plate disposed centrally thereof, a rounded step at the base of said circular ridge, a pair of semi-circular plates forming an annular disk having an outer diameter equal to the diameter of said plate positioned on said lip on said plate whereby a chamber adapted to receive a flange is formed between said plate and said annular disk, the two faces of said annular disk forming plane parallel surfaces, said annular disk having an inner diameter greater than the outer diameter of said circular ridge on said plate whereby an annular liner entry port leading to said chamber is formed between said circular ridge and said annular disk, means located within said annular disk and said plate at a level not above the unopposed plane surfaces of said annular disk and said plate for separably attaching said annular disk to said plate, a handle attached to said plate at the face forming a plane surface, means providing a fluid entry port passing through said plate and disposed substantially centrally of said circular ridge, a conduit leading through said handle to said fluid port, and fluid deflecting means located at the downstream side of said fluid port.

References Cited in the file of this patent
UNITED STATES PATENTS

| 1,307,372 | Palmer et al. | June 24, 1919 |
| 1,581,448 | Huetter | Apr. 20, 1926 |
| 1,589,177 | Kendall | June 15, 1926 |
| 1,757,994 | Emmerich | May 13, 1930 |
| 1,983,705 | Pilblad et al. | Dec. 11, 1934 |
| 2,608,501 | Kimble | Aug. 26, 1952 |

UNITED STATES PATENT OFFICE

CERTIFICATE OF CORRECTION

Patent No. 2,823,418                          February 18, 1958

Charles J. Fritts

It is hereby certified that error appears in the printed specification of the above numbered patent requiring correction and that the said Letters Patent should read as corrected below.

Column 3, lines 25 and 26, strike out "means of threads, although the flange may be attached to the metal pipe line by".

Signed and sealed this 21st day of October 1958.

(SEAL)
Attest:
KARL H. AXLINE

Attesting Officer

ROBERT C. WATSON
Commissioner of Patents